Dec. 24, 1935.  W. B. WELLS  2,025,078
ELECTRICAL RELAY SYSTEM
Filed Aug. 24, 1933  2 Sheets-Sheet 1
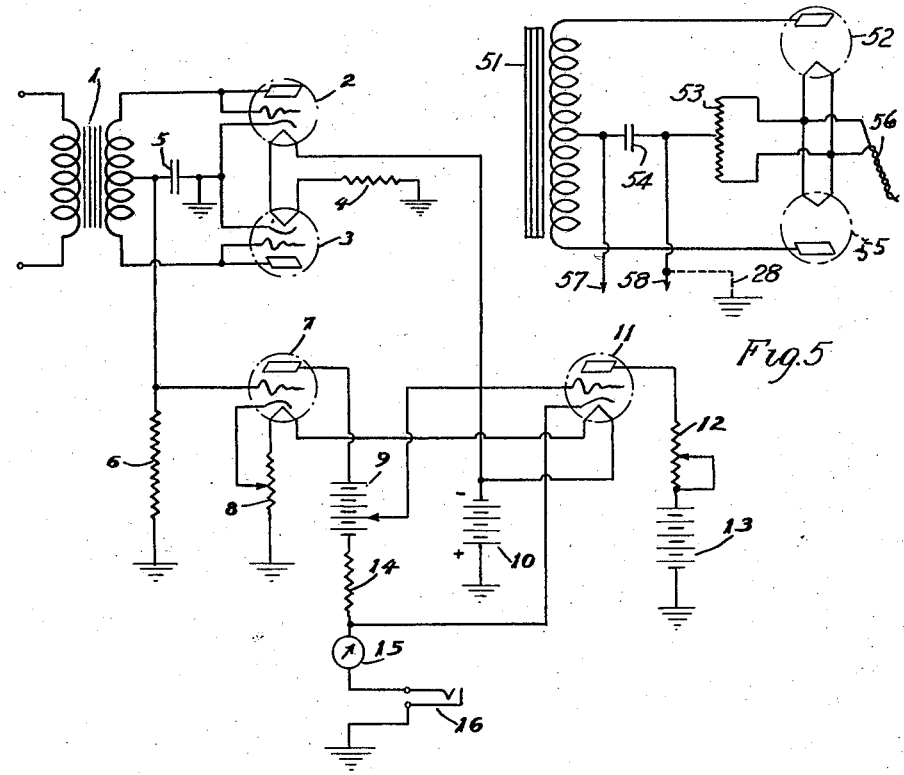
Fig. 1
Fig. 5
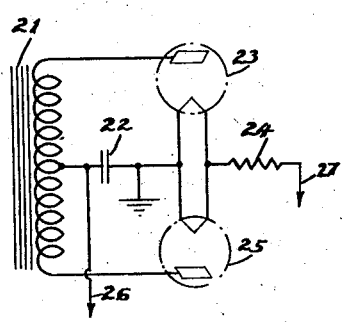
Fig. 2
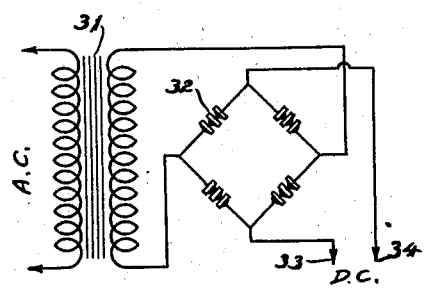
Fig. 3
INVENTOR
William B. Wells
BY
Harold Dodd
ATTORNEY Dec. 24, 1935.   W. B. WELLS   2,025,078
ELECTRICAL RELAY SYSTEM
Filed Aug. 24, 1933   2 Sheets-Sheet 2

INVENTOR
William B. Wells
BY
Harold Dodd
ATTORNEY

Patented Dec. 24, 1935

2,025,078

UNITED STATES PATENT OFFICE 2,025,078

ELECTRICAL RELAY SYSTEM

William B. Wells, Pearl Harbor,
Territory of Hawaii

Application August 24, 1933, Serial No. 686,593

6 Claims. (Cl. 178—88)

(Granted under the act of March 3, 1883, as
amended April 30, 1928; 370 O. G. 757)

This invention relates to electrical polar relays as used in systems of electrical signalling where it is desired to furnish a recording or indicating device with direct current impulses.

An object of my invention is to provide an electrical polar relay of simple and economical construction which converts audio-frequency alternating current into constant values of polar direct current within a wide range of variation of the alternating current input voltage.

Another object of my invention is to convert audio-frequency alternating currents into constant amplitude polar direct currents having sharply defined cut-offs at high keying speeds.

A further object of my invention is to provide a device which will convert the alternating current signal components as received from the output of a radio receiver into sharply defined direct current impulses capable of efficiently operating a standard high speed signal recorder or similar apparatus and providing currents for both marking and spacing.

A still further object of my invention is to provide a device for the purposes above mentioned which is capable of operating either on alternating or direct current supply, such capability being afforded by the necessary minor modifications hereinafter shown and described.

With the above and other objects in view, the invention consists in the construction, combination, and arrangement of parts as will be hereinafter more fully described.

Reference is to be had to the accompanying drawings forming a part of this specification in which like reference characters indicate corresponding parts throughout the several views and in which:

Fig. 1 is a schematic drawing of the device utilizing heater type triodes with direct current supply;

Fig. 2 shows the use of half wave two element type rectifier tubes with direct current filament supply;

Fig. 3 shows the connections for the use of dry oxide rectifiers;

Fig. 5 illustrates the use of half wave two element type rectifier tubes with alternating current filament supply.

Figure 4:
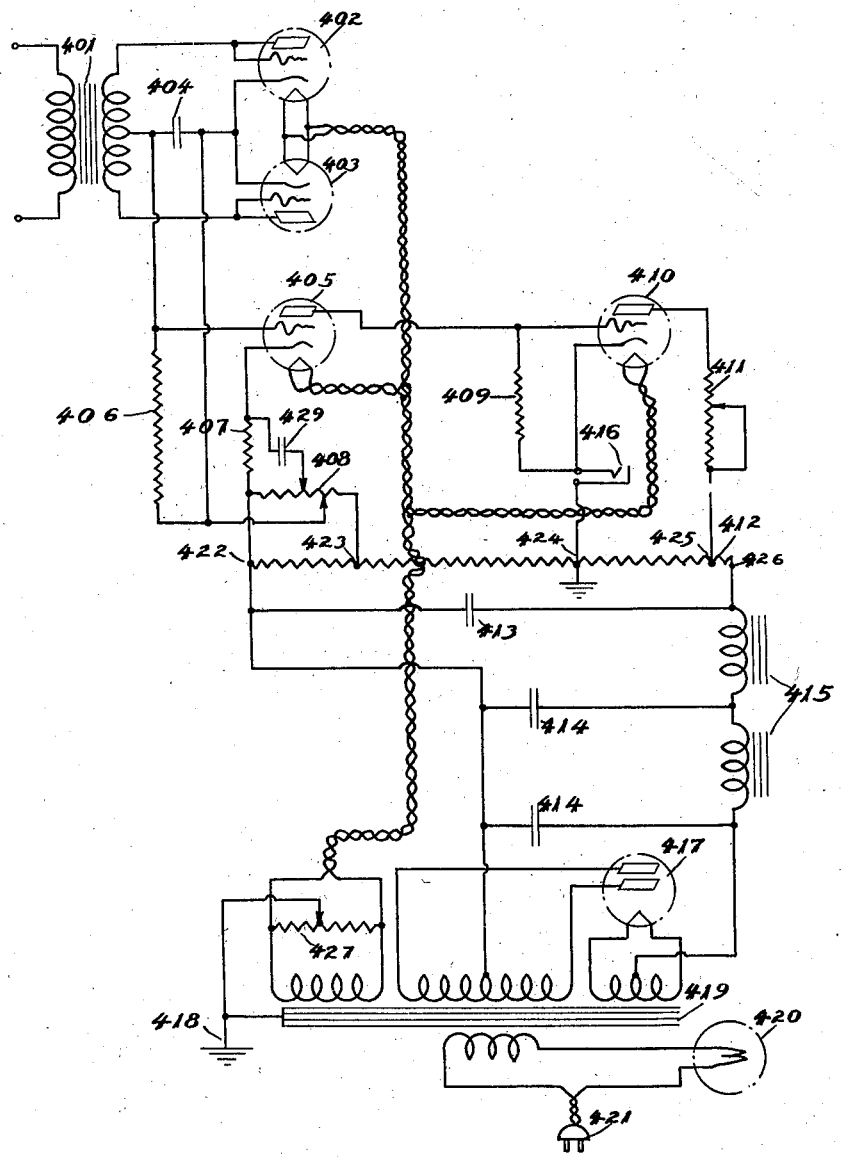
Fig. 4 is a schematic diagram of the device utilizing alternating current supply.

This device may be used in conjunction with a radio telegraph signal tape recorder such as the Boehme ink recorder or similar apparatus. It is designed to supply direct current of constant amplitude to the recorder for both marking and spacing of the signal when connected to the audio frequency output of a radio receiver or other source of keyed tone, and will produce clean cut signals on the tape at high keying speed, with a minimum of "drop outs".

The circuit consists fundamentally of vacuum tubes, either triode, tetrode, or pentode, of the A. C. or heater type, a signal rectifier, their associated plate and grid batteries as shown, resistors, current indicating meter, input transformer, and a source of current supply for the heaters.

Referring to Fig. 1, the operation of the circuit with direct current is as follows: An audio frequency signal from a radio receiver, tone channel, or similar source, is introduced into the unit at the primary of the step-up audio frequency transformer, I. The alternating current voltage appearing across the secondary of this transformer is rectified by the two rectifying tubes, 2 and 3, connected to give full wave rectification. Two element rectifiers may be employed at 2 and 3 to give linear rectification. The use of and connections for half wave two element type rectifier tubes and dry oxide rectifiers at this point is shown in Figs. 2 and 3. A high resistance, 6, affords the load for the rectifiers. When a signal is applied at I a rectified current flows in resistor 6 from ground to the center point of transformer secondary, I, since the cathodes of the rectifying tubes are connected to ground. The resultant voltage drop across resistor 6 is impressed across the grid circuit of vacuum tube 7. The circuit constants of this latter tube are so chosen that current flows in its plate circuit when no signal is applied at I. Since the moving coil of the recorder or other similar device is to be connected by means of jack 16 in series with the plate circuit of tube 7, this current will flow through the recorder coil and hold the recording pen, or other indicator, in the spacing position. This spacing current may be made any desirable value by proper selection of the plate potential 9. In order to permit sufficient plate current in tube 7 with a minimum of plate battery, the grid is given a small positive potential. This is accomplished by utilizing the voltage drop across resistance 8 produced by the heater current flowing in this resistance. This latter is shown as a potentiometer in Fig. 1, to permit initial adjustments but may be a fixed resistance with the cathode returned to the heater end, depending upon the type of tubes used and their current drain.

It will be noted that a fixed resistance 14 is also in series with the plate circuit of tube 7 and is common to the grid circuit of tube 11. Under conditions of no signal input, no plate current can flow in tube 11 because the voltage drop produced in resistor 14 is sufficiently large to bias this tube 11 to cut-off. When signal is applied at 1, a direct current will flow in resistor 6 and the resultant voltage drop will bias tube 7 to cut-off. This removes spacing current from the recorder coil and also the negative bias from the grid of tube 11. Tube 11 now draws plate current by virtue of its plate potential 13 and the small positive grid potential tapped off from plate battery 9 of the preceding tube. This plate current constitutes the marking current since it flows through the recorder coil in a reverse direction to that under conditions of no signal input and causes the coil to be pulled to the marking position. When the signal ceases, the sequence instantly reverses, thus producing polar action of the recorder coil.

The plate resistor 12, associated with tube 11, is merely a ballast resistance to prevent heavy current in case of short circuit of the recorder coil and to permit initial adjustment of the marking current. The meter 15 is a zero center milliammeter and is used to indicate the value of the marking and spacing currents and for adjustment of the circuits. Since it is common to the plate circuits of both tubes 7 and 11, it may be used in equalizing the marking and spacing currents and adjusting each tube independently to give complete cut-off. The marking and spacing current in the recorder may be made any desirable value by proper battery voltages at 13 and 9. In order to secure suitable current values without the use of large plate potentials, a compromise is made between the amount of plate voltage employed and the initial positive grid potential, since grid potentials will have an amplified effect on plate current by approximately the amplification factor (mu) of the tube.

The circuit is so adjusted that the smallest amplitude of applied signal voltage will cause cut-off of tube 7. Since any increase of signal voltage from any cause whatever can only result in cut-off of plate current at tube 7, this tube also functions as a maximum-limiter, and operates to produce practically constant values of direct current to the recorder. This result is further obtained by proper selection of tubes 7 and 11 and their parameters, as well as choice of resistor valves at 6 and 14. For high-mu tubes and consequent high sensitivity, resistance 14 should be large. The actual value will depend upon the amount of current necessary to operate the recorder at the highest speed. The use of high-mu tubes will provide greater sensitivity and tend to prevent small variations of the marking and spacing currents as a result of a widely varying signal input. Filament type tubes may be used at 7 and 11 provided that separate filament batteries are used and isolated electrically. The resistor 6 has a value which is determined by the type of tubes used at 2 and 3 but should be as large as possible in order to produce complete cut-off of tube 7 for weak signal inputs.

The tubes at 2 and 3 may be any type suitable for full wave rectification including the direct filament type or dry oxide rectifiers. These two possible modifications are shown in Figs. 2 and 3 and except for noting the fact the transformer 31 in Fig. 3 may or may not be center-tapped the center tap is not used, the figures are self-explanatory from an operational standpoint.

However, for maximum high speed keying, tubes of low internal capacitance must be employed. The condenser 5 should have as large a capacitance as possible without reducing the allowable keying speed. This is determined by the value of resistance at resistor 6.

In an experimental set-up embodying the operation and with the results described above, the following components were used to make up the circuit disclosed in Fig. 1: At 1, an audio frequency push-pull output transformer, 2 to 1 ratio, connected with normal secondary used as the primary; at 2 and 3, vacuum tubes of the type commonly known as —27; at 4, a fixed resistor of ½ ohm, 2 watt capacity; at 5, a fixed condenser of .05 md. capacity; at 6, a 50,000 ohm fixed non-inductive resistor; at 7 and 11, vacuum tubes as at 2 and 3; at 8, low resistance of potentiometer of the order of ¾ ohm, 2 watt rating; at 9, plate battery, approximately 100 volts, depending on the resistance of the recorder coil. For ten milliamperes recorder current and a high resistance moving coil, the plate battery potential should be, as given, 100 volts. The grid of tube 11 is given a small positive potential by tapping off at approximately 2 volts from the negative end of this battery; at 10, a 6 volt heater supply battery of large capacity; at 12, a 4000 ohm fixed, non-inductive resistor or a 5000 ohm rheostat in order that adjustment of current can be made to allow for recorder coils of different resistors; at 13, 100 volt plate battery; at 14, a 3000 ohm, non-inductive, fixed resistor; and at 15, a zero center, 25 milliampere full scale milliammeter.

This device may be operated entirely from an alternating current supply. The schematic circuit for such a unit is shown in Fig. 4. The fundamental operation of the A. C. circuit is identical with that of the D. C. circuit and will therefore not be explained in detail.

The A. C. system may employ any satisfactory form of "eliminator" such as is used with A. C. receivers for power supply. The power supply unit shown is a typical satisfactory form and consists of the power transformer 419, full wave rectifier 417, filter chokes 416, condensers 413 and 414, voltage divider 412, and plug 421. The tube 417 may be a full wave rectifier tube of the —80 type or may be replaced by two half wave rectifiers of the —81 type. The transformer 419 must have a separate 5-volt secondary winding to provide current for the rectifier filaments, and a 2.5 volt winding for the heater circuit supply. This latter winding must be capable of supplying 7 amperes continuously, since most heater type tubes require a heater current of 1.75 amperes per tube. The grounded potentiometer 421 shown across the 2.5 volt winding is for the reduction of 60 cycles ripple and possible resulting instability of the circuit. This precaution will generally not be necessary and the winding may be left ungrounded.

The potential divider 412 must be of the heavy duty type capable of dissipating 25 or 30 milliamperes without appreciable change in wire resistance due to heating.

The total D. C. voltage output of the power supply need not be over 250 volts. This will depend somewhat on the type of tubes used in the circuit but should be sufficient for most types of heater tubes now commercially available. The ballast tube 420 shown in the power transformer primary is to provide additional stability and improve voltage regulation, but is not essential to operation and may be omitted if the power supply is efficient. For a higher degree of stability and regulation, a series of three voltage control tubes, commonly known as the 874 type, may be connected across the potential divider 412. The bleeder current in this divider should be of the order of 20 milliamperes or greater to insure good stability since the keying tubes will pass approximately 10 amperes for operation of the recorder. In the circuit as shown, an experimental value of total divider resistance of 12000 ohms for a total voltage of 250 volts and bleeder current of 20 milliamperes has been used. A 5000 ohm potentiometer 408 is connected across the divider 412 between the negative terminal and a point approximately 10 volts positive is at 422 and 423. The purpose of this is to permit adjustment of a small initial positive potential on the grid of the first keyer tube. The resistor 407 in the cathode lead of this tube 405 is of 250 ohms resistance. Its purpose is to improve stability and also to permit ease in adjustment of the grid potential to a small value which would otherwise be difficult, since this grid potential should be only about 2 volts. With a 10 milliampere current flowing in resistor 407, a negative bias of 2.5 volts would normally appear on the grid of the tube.. The arm of the potentiometer may now be moved in the positive direction to a point of approximately 5 volts, thus placing a positive potential of 2.5 volts on the grid. Where severe ripple fluctuation is present due to inadequate filtration in the power supply, the ripple components may be balanced out by means of a condenser 429 in the order of 1 m. f. capacitance, connected between the cathode and a point of positive potential on the potentiometer 408. The voltage across the section 423—424 of voltage divider 412 should be approximately 100 volts, or sufficient to allow tube 405 to pass 10 milliamperes of current when no signal voltage is applied. The voltage across section 424—425 of voltage divider 12 should be slightly greater than 100 volts to allow tube 410 to pass 10 milliamperes when signal voltage is applied to the unit as there is practically zero grid potential of tube 410. As with the D. C. circuit, a suitable dry oxide rectifier unit may be used in place of tubes 402 and 403.

If it is considered desirable to ground one side of the recorder moving coil, the return point of this circuit to the divider may be grounded, as at 424, provided no other point of the active circuit is at ground potential. If, when using filament type tubes, the filament circuit is grounded as shown at 28 in Fig. 5, the ground must be removed from the recorder.

Selection of optimum voltage and resistor values along the voltage divider depends upon the types of tubes employed and the magnitude of recorder coil current used. The power supply proper may be isolated from the keying unit but the potential divider should preferably be located within the unit and a two-wire lead run from the power supply to the divider terminals.

It will be understood that the above description and accompanying drawings comprehend only the general and preferred embodiment of my invention and that various changes in construction, proportion and arrangement of parts may be made within the scope of the appended claims without sacrificing any of the advantages of this invention.

The invention described herein may be manufactured and used by or for the Government of the United States of America for governmental purposes without the payment of any royalties thereon or therefor.

What I claim as new and desire to secure by Letters Patent of the United States is as follows:

1. An electrical polar relay for converting alternating current signal impulses into spaced direct current impulses comprising in combination an input transformer with a center tapped secondary feeding into a full wave linear rectifier consisting of two heater type vacuum tubes each having a filament, cathode and anode; a fixed load resistor in the anode circuit of said rectifier; a control heater type vacuum tube having a cathode, grid and anode with its grid circuit comprising said fixed load resistor and its anode circuit comprising a source of potential, a fixed resistance, and a jack in which may be plugged a recorder coil, said control tube being operatively adjusted to pass an anode current of predetermined value when no alternating current input is being introduced and to cut off said anode current when an alternating current input is introduced; a second control heater type vacuum tube having a cathode, grid and anode with its grid circuit connected across the fixed resistance in the anode circuit and a part of said source of anode potential of said first control tube and with its anode circuit comprising a second source of potential, and said jack, said second control tube being operatively adjusted to pass an anode current of predetermined value when an alternating current input is provided and to cut off said anode current of said second control tube when no alternating current input is provided whereby a controllable reversible direct current is caused to pass through said jack, and its attached recorder coil.

2. An electrical polar relay comprising an alternating current input device, a full wave rectifier having a fixed load resistor in its output circuit, a first three electrode control tube directly coupled to the output of said rectifier by means of said fixed load resistor, a second three electrode control tube whose input is resistance coupled to the output of said first control tube and a point common to the output circuits of said control tubes, said control tubes being operatively adjusted to pass through said common point reversible direct current whose direction is dependent on the presence of an alternating current in said alternating current input device.

3. An electrical polar relay for converting alternately current signal impulses into spaced reversible direct current impulses comprising in combination an input transformer with a center-tapped secondary feeding into a full wave linear rectifier consisting of two vacuum tubes each having a cathode and anode; a fixed load resistor in the anode circuit of said rectifier adapted for carrying a unidirectional rectified alternating current impulse; a first control vacuum tube having a cathode, grid and anode with its control grid circuit comprising said fixed load resistor and its anode circuit including a source of potential, a fixed resistance and a jack in which may be plugged a recorder coil, said control tube being operatively adjusted to pass an anode current of predetermined value when no rectified alternating current is passing through said load resistor and to cut off said anode current when rectified alternating current is passing through said load resistor; a second control vacuum tube of the heater type having a cathode, grid and anode with its control grid circuit comprising said fixed resistance and a predetermined part of said source of anode potential of said first control tube and with its anode circuit including a second source of potential and said jack, said second control tube being operatively adjusted to pass an anode current of a predetermined value through said common jack and connected device in a reverse direction to that of the anode current of said first control tube only when a rectified alternating current is passing through said load resistor.

4. An electrical high speed control circuit, comprising in combination a first thermionic vacuum control tube having at least a cathode, grid, and anode; a source of direct current anode potential for said first control tube; means for supplying a high negative bias to the grid of said first control tube and a normally flowing anode current in its output circuit; a second thermionic vacuum control tube having at least a cathode, grid and anode whose input grid circuit is resistance coupled only to the output anode circuit of said first control tube; a source of direct current anode potential for said second control tube, and a normally inoperative anode circuit; resistor means for controlling the values of current in said anode circuits; a common source of filament potential; and a point common to the anode circuits of said first and second control tubes whereby a controllable reversible direct current is made to pass through said common point, the direction of said reversible current being dependent on the presence of a high negative bias on the grid of the said first control tube.

5. In a system of high speed telegraphy, an electronic polar relay comprising in combination a first electronic control tube having a cathode, grid and anode, a normal grid potential positive to said cathode, means for supplying a high negative bias to said grid, an anode circuit normally operative with a predetermined value of direct current; a second electronic control tube having a cathode, grid and anode, resistance coupled only to the anode circuit of said first control tube, a normal grid potential highly negative to its corresponding cathode and a normally inoperative anode circuit; means included in the anode circuit of said first control tube for supplying a positive potential to the grid of said second control tube; resistor means for controlling the values of said anode currents, sources of filament and anode potential and a point common to the anode circuits of said first and second control tubes whereby a controllable reversible direct current is made to pass through said common point, the direction of said reversible current being dependent on the presence of a high negative bias on the grid of said first control tube.

6. A device for causing a direct current to flow in an output device in one direction responsive to the reception of an alternating current impulse and for causing a direct current to flow in said circuit in the opposite direction when no alternating current impulse is being received comprising means for rectifying said alternating current impulses, means for utilizing the direct current derived from said alternating current impulses to cause a potential drop across an impedance, a thermionic relay, means for connecting said relay so as to utilize the potential drop across said impedance for controlling the current in the output circuit of said relay, an impedance in the output circuit of said relay, a second thermionic relay, means for connecting said second relay, so as to utilize the potential drop across said impedance in the output circuit of the first said relay for controlling the current in the output circuit of the second relay, an output device, and means for connecting the said output device in the output circuit of each of said thermionic relays.

WILLIAM B. WELLS.